Aug. 28, 1962 R. L. CARSON 3,051,895
GAS DETECTION
Filed April 21, 1955
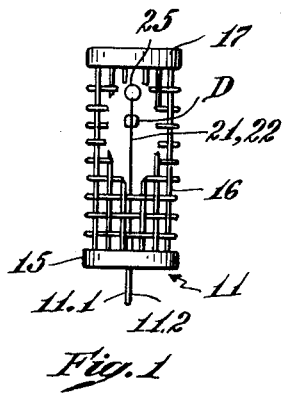
Fig. 1
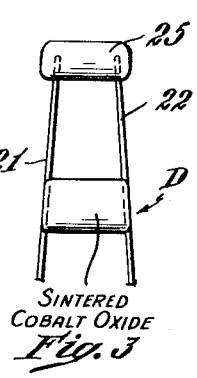
SINTERED COBALT OXIDE
Fig. 3
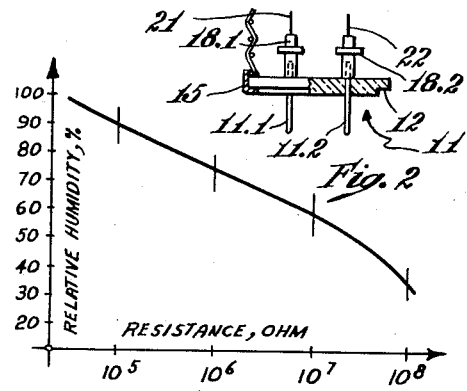
Fig. 2
Fig. 5
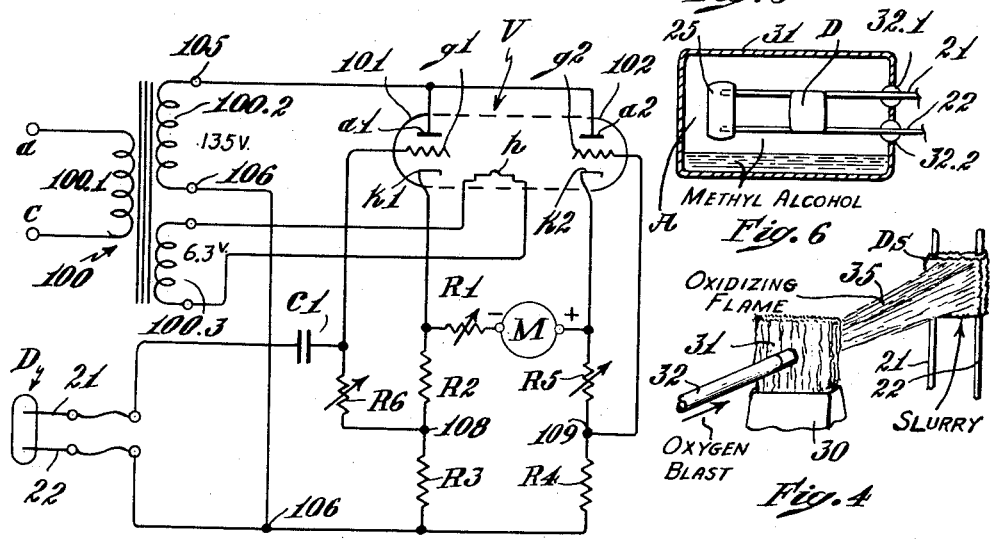
Fig. 7
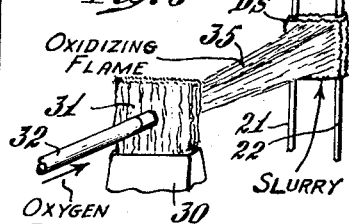
METHYL ALCOHOL
Fig. 6
Fig. 4
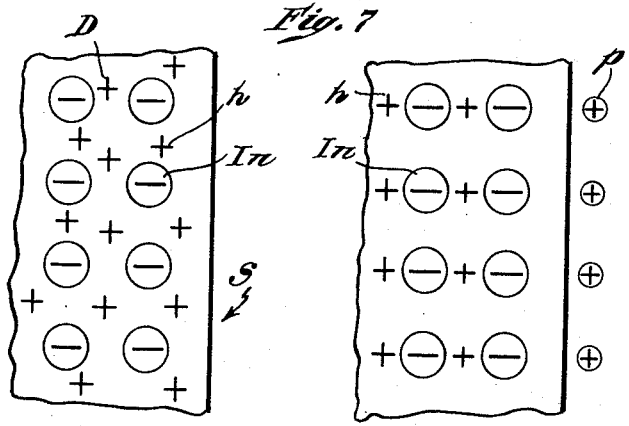
Fig. 8   Fig. 9
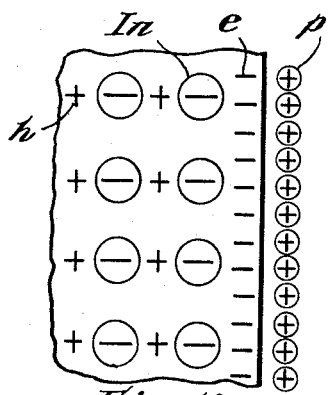
Fig. 10
Inventor
Robert L. Carson
by Roberts, Cushman + Grover
Att'ys United States Patent Office 3,051,895
Patented Aug. 28, 1962

1

3,051,895
GAS DETECTION
Robert L. Carson, 305 El Monte Road, El Cajon, Calif.
Filed Apr. 21, 1955, Ser. No. 502,840
3 Claims. (Cl. 324—71)

The present invention relates to the qualitative and quantitative detection of certain types of gases or vapors including humidity detection, and also to temperature detection with the aid of such gases.

Objects of the present invention are to provide a detector of the above indicated type which is accurate over a comparatively wide range, whose operating range can be selected during manufacture, which responds more consistently than heretofore proposed devices of this type, whose response is linear over a wide range of values, which is comparatively insensitive to ambient temperature changes (responding as a temperature detector to temperature depending gas properties rather than directly to temperature), which responds instantaneously to changes of phenomena to be detected, and which is compact, inexpensive and adaptable to various uses and degrees of accuracy.

Another object is to provide a humidity detector which has the above indicated characteristics.

Another object is to provide a temperature detector likewise having the above indicated characteristics.

An additional object is to provide a method for making bodies that are sensitive to the presence and concentration of certain gases or vapors, and for predetermining certain response characteristics of such bodies.

An additional object is a method for detecting and indicating the presence and concentration of certain gases and vapors, by means of a simple and inexpensive, and yet reliable and accurate electric measuring technique employing bodies operating, and manufactured according to the invention.

A brief summary of the invention indicating its nature and substance, for attaining the above objects, is as follows.

A probe for the qualitative and quantitative detection of gases and vapors according to the invention comprises a p-type semiconductive body, containing a suitable impurity such as oxygen, of a substance whose bulk conductivity including the subsurface conductivity is reproducibly affected proportionate to the density of substances in contact therewith and having dipole moments forming on the p-type semiconductive body a layer of n-type conductivity. In a preferred embodiment, two spaced conducting members such as metal wires are bridged by a crystalline body including a substance of the group consisting of germanium, oxides of cobalt and oxides of nickel, in the form of a plurality of crystals which are in contact with each other at least over part of their surfaces such as to present at least one essentially continuous bridge between the conducting members. The sintered body can include, according to the invention, a substance such as for example lithium oxide, that modifies the conductivity range of the body, as distinguished from an impurity admixture to the crystalline body which renders it a p-type semiconductor. In a preferred embodiment of the invention, the crystalline body consists principally of a mixture of cobalt oxides in the form of minute crystals. However, the invention also contemplates the use of monocrystalline bodies, such as of an oxide of a metal of the group consisting of cobalt and nickel.

In another aspect, a temperature probe according to the invention comprises two spaced conducting members such as metal wires to which is joined a body of the above characterized constitution, which body is sealed within a vessel containing a substance having a molecular dipole moment, in its gaseous state as well as in its liquid state.

2

Probe means according to the invention when freely exposed to the ambient atmosphere are affected by ambient gases or vapors having certain properties including molecular dipole moments which affect the electronic energy structure and thus the conductivity of the body, as set forth above, dependent on the nature and amount of the gas or vapor, permitting detection or measurement thereof by way of this conductivity.

Temperature detecting probes according to the invention permit measurement of the ambient temperature by way of the conductivity of the body whose electronic energy structure depends on the density of a selected ambient vapor which again can be made dependent upon the temperature, as pointed out above.

In a further aspect of the invention, the above characterized probe body is combined with electric measuring apparatus that includes a voltage source connected across the conducting members of the body and means for detecting conductivity variations of the body caused by the effect of ambient gases or vapors as indicated above.

In another aspect, the invention includes a method of detecting and measuring the density of a substance having dipole moments which method comprises the step of contacting the substance with a probe body of the above characterized general type, the step of applying a potential difference between two distinct points of the body, and the step of measuring the conductivity between these points in terms of variation of current resulting from the potential difference. In this manner the nature and amount of ambient gas or vapor and hence its density can be detected by way of the effect upon the electronic energy structure on and near the surface of the bridge formed by the above defined semiconductive body. If the said body is confined within a closed vessel containing a substance in its liquid as well as gaseous phases, capable of affecting the electronic energy structure on and near the surface of the body, and if the conductivity of the surface bridge of the body between two conductors as affected by the gas at varying temperature is measured, the ambient temperature can be detected by way of the effect of the gas on the electronic energy structure on and near the surface of the bridge.

In an additional aspect of the invention, bodies according to the invention are made by preparing a slurry by mixing into cohesion means, such as water, crystalline particles of a substance having the above outlined characteristics, such as cobalt oxide, by applying a mass of the slurry to two distanced conductors bridging them with the mass, by heating the mass to a temperature capable of eliminating the cohesion means, and by sintering the slurry in an oxidizing ambient to join at least part of the surfaces of the crystalline particles to form an essentially self-supporting body.

These and other objects and aspects of novelty of the invention will appear from the herein presented outline of its principles, its mode of operation and its practical possibilities together with a description of several typical embodiments illustrating its novel characteristics. These refer to a drawing in which FIG. 1 is a side elevation, with the protective enclosure partly broken away, of a probe according to the invention;

FIG. 2 is a front elevation of the probe base, with the right-hand portion in section;

FIG. 3 is a front elevation of the probe body alone;

FIG. 4 is a diagram illustrating a method of preparing the probe;

FIG. 5 is a diagram illustrating the relation between the relative humidity of an atmosphere surrounding a body according to FIGS. 1 to 3, and the resistance between the supporting wires;

FIG. 6 is a diagrammatic cross section through a temperature detector according to the invention;

FIG. 7 is a circuit diagram illustrating a measuring device combined with a probe body according to the invention, for the convenient detection of the probe conductivity as affected by an ambient atmosphere; and FIGS. 8 to 10 are diagrams illustrating the mode of operation of devices according to the invention.

FIGS. 1 and 2 show a conventional base 11 such as used for vacuum tubes and similar electronic equipment, with prongs 11.1 and 11.2 mounted on an insulating base plate 12. A metallic ring 15 is fastened to plate 12, such as by crimping and soldering. To this ring is soldered a cage 16 with a metallic top plate 17. Mounted by suitable terminals 18.1 and 18.2 on prongs 11.1 and 11.2 are two conducting members such as wires 21 and 22 which are spaced at one end by the terminals 18 on the prongs 11, and on the other end by means of a distancing bead 25 of glass or other suitable insulating material. Intermediate the base structure and the distancing bead 25 is the probe body or bead proper, indicated at D.

The body D consists of semiconductive material of the above described type, either in the form of a single crystal or of crystalline particles of cobalt oxide, nickel oxide, or germanium. In a preferred embodiment, the bead D consists of sintered cobalt oxide particles containing oxygen as an impurity. The exact structure of this body will best be conceived from the following description of the method of producing it.

For making the probe body according to the invention, two wires such as 21 and 22 of FIGS. 1 to 3 are joined by the insulating distancing structure 25 and at the other end held in suitable clamping means. A slurry is prepared by mixing the above mentioned oxides or the germanium, in powder form, with a suitable cohesion means such as water, the proportion of crystalline powder and of water being such that a mass of the slurry will be firm enough to be retained between the two wires 21 and 22 upon its application thereto with some caution, by means of a suitable tool such as a glass spoon or rod.

In a preferred embodiment, the crystalline powder is commercially available cobalt oxide, consisting mainly of $Co_2O_3$ but containing CoO and possibly traces of $Co_3O_4$. At high temperatures, these oxides take on, or discharge oxygen, as will be discussed below. In this embodiment, some powdered lithium oxide can be added to the cobalt oxide to serve as a filler or diluent, for controlling the conductivity of the cobalt oxide bead.

The mass of slurry shown at Ds of FIG. 4 between the two wires 21 and 22 is then sintered by subjecting it to an oxidizing flame or any other heating means which is oxidizing and nonreducing. Whatever heating means is used, it must be of such a nature that any tendency to remove oxygen from the slurry and especially from the crystalline particles therein is with certainty avoided and excluded. In other words whatever conditions prevail during the sintering of the slurry, oxygen has to be supplied and retained to an optimum amount, and not taken away during heating as well as cooling. FIG. 4 illustrates a simple but in small production fairly effective method of sintering under such conditions as follows. 30 is a gas burner producing a non-luminous flame 31. 32 is a blow pipe directing a blast of oxygen into the non-luminous or central portion of the burner flame 31. An oxidizing flame 35 results, and care is taken that it covers practically the entire slurry or that it is moved to heat it uniformly. It is difficult to ascertain exactly what happens during the sintering, but the following explanation is fairly plausible.

In the preferred embodiment that employs cobalt oxide, the semiconducive material is bought in the form of $Co_2O_3$ powder, but this commercial cobalt oxide is probably not chemically pure but, as mentioned above, contains also CoO and $Co_3O_4$. Upon heating during the sintering process the $Co_2O_3$ goes through two transitions, one at about 375° C. where the $Co_2O_3$ is converted to $Co_3O_4$ and again at about 800° C. where the $Co_3O_4$ is converted to CoO. Above this temperature CoO seems to be the stable phase. Thus during this transformation there is a tendency for the material to evolve oxygen. This is prevented or minimized by using the aforementioned oxidizing flame, as well as by providing an oxidizing ambient, for example air, during the cooling process. It is difficult to ascertain the exact phase state of the bead after the heat treatment and cooling cycle, but it is reasonably certain that in the oxidizing ambient the material occludes oxygen which remains as interstitial or lattice defect or impurity, with the effect which will be explained hereinbelow. It is possible that oxygen is incorporated in some other fashion, but the above explanation seems most plausible at this time. The oxygen content can be to some extent controlled by the initial constituents of the slurry as well as by the flame temperature, the duration of the sintering step and by the cooling gradient.

At any rate, it will be understood that the sintered probe body D will contain various cobalt oxides, $Co_2O_3$ forming at lowest temperature, $Co_3O_4$ at intermediate temperatures, and CoO at the highest temperature to which the slurry is subjected, and that in addition it will contain, oxygen constituting an impurity, in solution, oxygen constituting an impurity, which impurity oxygen may originate in the oxidizing flame or the metal oxide, or both.

Instead of cobalt oxide, nickel oxide can be used in similar manner, and also germanium.

As mentioned above, the final conductivity range of the sintered crystalline body can be controlled to some extent by including in the slurry a comparatively small amount of filler or diluent. About 10 atomic percent of lithium in the form of $Li_2O$ effect considerable lowering of resistance; the amount of this conductivity modifying substance required for a desired range of conductivity must be ascertained by shop experiment in the usual manner. Any given admixture, once established for a certain range, gives fairly consistently reproducible results for the purpose of obtaining sintered bodies of that range.

Instead of lithium oxide, oxides of beryllium, sodium, manganese, calcium, aluminum and silica can be used as diluents. Small amounts of these admixtures, especially lithium, shift the resistivity range, possibly by affecting the mobility of electrons. It is also possible that they affect the preponderance of one or the other cobalt oxide in the finished body.

After the slurry is sintered, it constitutes a crystalline body including cobalt or nickel oxides, or germanium, in the form of a plurality of crystals which are in contact at least over part of their surfaces such as to present at least one essentially continuous bridge between the conducting members, such as the wires 21 and 22.

Instead of using bodies obtained by sintering crystalline powders of the above mentioned oxides or of germanium, these substances can be used in the form of monocrystals suitably supported between conductive members.

The nature of the substances employed, so far as pertinent to their functioning for purposes of the invention, will be further explained hereinbelow as a preliminary to the explanation of its mode of operation.

FIG. 5 indicates, by way of example, the dependency of the resistance, in ohms, of a body such as indicated in FIG. 3, upon the relative humidity, in percents, of ambient atmosphere. It will be noted that this characteristic is fairly straight within a wide range. This characteristic is furthermore reproducibly stable throughout its extent so that the non-linear part thereof can be utilized by suitably calibrating a detecting instrument such as will be described hereinbelow.

As will become apparent from the exposition of the operation of bodies according to the invention, such bodies can be used for detecting certain gases or vapors, and also for detecting the density of a given gas or vapor.

The humidity detection as discussed above with reference to FIG. 5 is of course a specific instance of such gas detection and measurement.

Since the conductivity of a body according to the invention does not particularly vary with temperature, the varying density of a given ambient as dependent on its temperature, can be used for temperature detection. At any rate, the resistance variation of the body with variation of temperature and density of the ambient is fairly consistent and reproducible so that a resistance scale can be calibrated in terms of temperature. An application of this principle is illustrated in FIG. 6.

FIG. 6 shows at 31 a closed vessel, such as of glass, into which are brought by conventional means, such as for example beads 32.1 and 32.2, the supporting wires 21, 22 of a structure according to FIGS. 2 and 3. The vessel 31 is filled with the liquid as well as gaseous phase of a suitable substance A, having in its gaseous phase a molecular dipole moment. Methyl alcohol is suitable for this purpose. Within such a sealed vessel, the density of the vapor A surrounding the body D will be dependent upon the temperature so that the temperature can be measured by means of the conductivity of the sintered body D.

An arrangement suitable for measuring the conductivity of the probe according to invention, and hence the density of the ambient, will now be described with reference to FIG. 7.

In FIG. 7, numeral 100 indicates a power supply transformer with a primary 100.1 connected to the terminals $a$, $c$ of a standard power supply line, with a secondary 100.2 for supplying the measuring circuit proper, and a secondary 100.3 for heating the vacuum tube components of the circuit. This circuit is of the type which permits compensation of detector constants and calibration of the meter proper, by means of two amplifying tubes one of which is controlled by the signal from the detecting probe whereas the potential of the control electrodes of both tubes, and the current through the meter can be adjusted for compensation and calibration. For purposes of the present practical embodiment, two tube units are utilized which are incorporated in a twin triode of the 12AU7 type. The two triodes are independent excepting for the common heater, as indicated at V of FIG. 7. The triode units 101, 102 have anodes $a1$, $a2$, control electrodes $g1$, $g2$, cathodes $k1$, $k2$, respectively, and a heater $h$. The anodes $a1$ and $a2$ are connected to the terminal 105 of secondary 100.2 whereas the cathodes and control electrodes are connected to the secondary terminal 106 through a measuring circuit, as follows.

The measuring circuit proper consists of the following components. A milliammeter M and an adjustable resistor R1 are connected in series between the cathodes $k1$, $k2$ of the amplifier tube V. Between cathode $k1$ and terminal 106 are connected biasing resistors R2 and R3 and between cathodes $k2$ and terminal 106 corresponding resistors R4 and R5 which latter is adjustable. The probe proper is indicated at D, with lead wires 21 and 22, corresponding to FIGS. 1, 2, 3 and 6. One of the lead wires, for example 22, is connected to terminal 106. The other lead wire 21 is connected to grid $g1$ through a capacitor C1, and an adjustable resistor R6 is connected between the grid and the midpoint 108 between the biasing resistors R2 and R3. Grid $g2$ is analogously connected to midpoint 109 between the biasing resistors R4 and R5.

In a practical embodiment the above mentioned components are as follows:

V _____ Type 12AU7 medium-mu twin triode.
C1 _____ 0.1 μf.
R1 _____ 500 ohms.
R2 _____ 1000 ohms.
R3 _____ 10000 ohms.
R4 _____ 2500 ohms.
R5 _____ 10000 ohms.
R6 _____ 2.5 megohms.

The meter M indicates the difference of voltage drops between 106 and the grids $g1$ and $g2$, respectively, the former being affected by the voltage drop across the probe body D which is in parallel to resistor R3.

The above described circuit is appropriate for cobalt oxide probes as described above, having a resistance range of about 100 megohms as indicated in FIG. 5, from about 100 megohms at low humidity, to less than 100,000 ohms at 100% humidity. This circuit permits adjustment to variations between individual detection units by setting the three variable potentiometers R1, R5, R6 to establish calibration points on the meter. It will be understood that resistor R1 permits calibration for maximum reading and resistor R5 for minimum readings, and that resistor R6 permits midscale calibration. The scale of meter M, if calibrated in percents of humidity will not be linear but monitors a resistance change of better than 1000/1 in the 0% to 100% humidity range. It will be understood that the current through the indicating D.C. milliammeter depends upon the power supply voltage at terminals 105, 106, of about 135 volts in the above described example, and that the accuracy of the humidity reading will be affected by line voltage variations. Therefore, if constant accuracy is required, the power supply should be regulated by conventional means.

The response time of probe bodies according to the invention is in the order of a few seconds with respect to variations in relative humidity over ranges considerably greater than 15%.

It will be understood that the invention is not restricted to the above described example utilizing cobalt oxides. Nickel oxides can be utilized similarly, and also germanium sintered from commercially available germanium powder, as above described with reference to cobalt oxide. Also, detector bodies made from a slurry containing nickelous oxide and cobaltic oxide, about half and half, was found to have the above described properties.

The advantages of the herein described probe and detecting apparatus will now be apparent. Some of them are a fairly consistent response as compared with those of previously suggested devices, the possibility of using a polycrystalline body instead of single crystals which are difficult to make (although they can be utilized) and, as compared to sintered bodies, do not offer the greatest possible surface area for interaction of a body of given overall size with the ambient, and the possibility of mixing into the slurry substances such as lithium oxide for modifying the gross characteristics of the probe, imparting thereto different conductivity ranges, and giving it additional structural strength.

Probes of the above described type have a fairly constant temperature coefficient so that direct reading of relative humidity is possible at all temperatures within reasonable range. The same property makes it possible to use these probes for temperature measurements by way of temperature dependent density variations of a confined ambient such as methyl alcohol, as described with reference to FIG. 6.

Devices of the above-described type operate according to principles which will now be outlined so far as absolutely necessary for a proper understanding of the invention.

The practically established utility of devices according to the present invention, constructed as above described, is most likely due to a peculiar behavior of p-type impurity semiconductors which are in contact with vapors, which behavior has been explored by various experiments and theoretically interpreted according to present day concepts in this branch of physics, as follows.

For a better understanding of the terminology herein used, a few concepts pertaining to conductivity as herein employed will first be shortly recapitulated.

The conductivity of a given crystal or crystalline body depends largely on its "electronic energy structure," which term is herein understood to mean any state of electronic energy that is possible in a body of given substance and form, as well as the distribution of electrons among these states of the body. In this context, a "crystal" whether a monocrystal or a polycrystalline body is herein understood to mean a group of molecules wherein is repeated over a macroscopic extension the given point symmetry of a minimal subgroup of molecules. An important embodiment of the invention utilizes crystalline bodies which are formed by joining crystals or crystalline particles by way of "sintering," which term is herein understood to mean the cohesion of crystals or crystalline particles, assisted by an increase in temperature and possibly, but not necessarily, pressure.

Both "metallic" and "covalent" or "homopolar" crystals, as distinct from ionic crystals, are characterized by having a density of electrons that is spread practically continuously, although not uniformly, throughout the crystal structure. In the case of metallic crystals this electron density is essentially uniform, whereas in covalent or homopolar crystals the electron distribution varies from the essentially uniform electron distribution of metallic crystals to the essentially discontinuous electron distribution of ionic crystals. We are here dealing with crystals having electronic rather than ionic conduction, excluding however the limiting case of metallic conduction. It is understood that germanium, which can be used for purposes of the invention, is usually classified as a metal although it does not exhibit metallic conduction; for present purposes it can be considered to be a homopolar crystal.

The concept "electronic energy structure" includes (by way of models used to interpret certain mathematical relations derived from experimental measurements which are reproducible with reasonable certainty) the concept of electrons distributed among certain energy states or "levels" which are arranged in groups or "bands" determined according to quantum theory principles by eigenvalues depending on boundary conditions at the face of a crystal with a certain lattice periodicity. The electrons may or may not be localized spatially. At most, only two electrons can stably exist in each energy state or level. The "valence band" is the lowest energy band and is generally occupied by the valence electrons which are involved in the chemical properties of individual atoms.

Conduction is the net flow of electrical charge caused by applied potentials affecting the electron energy. Having in mind that each band has several energy levels of allowed eigenvalues and that according to the Pauli exclusion principle at most only two electrons can occur in each level, conduction depends on the relation of one-half the number of valence electrons in the entire crystal to the number of eigenvalues or levels in the valence band. If these two numbers are unequal, a band is not fully occupied, a net number of electrons can wander in a particular direction, and conduction takes place under the influence of an applied field. If the two numbers are equal, there are no "free" electrons and the body is in the first approximation an insulator. However, a crystal of the homopolar or heteropolar kind becomes a semiconductor if somehow electrons are transported from a lower, completely occupied band of an insulator to an upper, empty band, so that incompletely occupied bands are established whereby conduction can take place. This transportation can occur by reason of elevated temperatures or of irradiation, and bodies exhibiting this effect are called intrinsic semiconductors. The semiconduction can be expressed in terms of unfilled levels or "holes," serving as carriers of positive charge and representing the electrons missing in the valence band as well as electrons serving as carriers of negative charge in the conduction band, which is the next band laying above, in terms of energy, the valence band.

Instead of thermally or optically dislodging electrons of a band of a crystal of the insulator type, conduction electrons or holes can be introduced by the effect of an impurity substance having an energy level in a forbidden zone between two bands of the crystal carrying the impurity. The impurity can be either a "donor" such as a metal giving up from its valence shell an electron to the upper, or conduction band, leaving a positive ion, or an "acceptor" such as oxygen which becomes negatively ionized by accepting in its valence shell electrons from the lower or valence, energy band, leaving holes in that band. In the first instance, the electrons from the donor effect conduction in the conduction band of the crystal, and since the conduction is thus due to negative charges, such bodies are called n-type impurity semiconductors.

In the second instance, the levels of the carrier crystal from which charge is removed by the ion formation in a higher energy level of the impurity, provide positive holes which conduct in the above-mentioned sense; accordingly, such bodies are called p-type impurity semiconductors.

Differentiating experimentation has indicated, for reasons which will be pointed out below, that the phenomenon which is herein utilized is not due, as might seem possible, to exterior surface conduction on the detector body, but to the behavior of crystals essentially of the p-type semiconductive homopolar type, effective in the manner now to be discussed with reference to FIGS. 8 to 10, which are diagrammatic sections through a region near a surface of such a crystal.

Combining the general model of a crystal of the p-type impurity semiconductor type to the previously outlined model of covalent crystals, and having in mind the well justified assumption that both these concepts apply to the crystal structures herein employed, the following explanation of the operation of these structures becomes optimally plausible and hence well suited for defining certain aspects of the invention.

As set forth above it is well known that impurities and interferences such as optic or thermic changes, vary the electrical and optical behavior of semiconductors to a considerable degree. In each case there is an alteration in the electronic energy structure as defined above, in which case a measurable current may be permitted to flow in a moderate electric field, or an alteration can be produced in a current that flows in a moderate electric field, which alteration corresponds to the alteration in electronic energy structure.

It is believed that such electric behavior changes, manifesting themselves as conductivity variations, can be caused by an effect exerted at the surface of crystals of this type by bodies having dipole moments, and that these variations are functions of the density of these bodies in the environment and that, therefore, they discriminate qualitatively between dipole moment molecules and symmetrical molecules, permit quantitative measurement of these substances (such as of the density of water vapor, which has a dipole moment), and further permit temperature measurement by way of conductivity measurements on bodies according to the invention while confined under isochoric restriction, in a dipole moment vapor. This effect will now be explained.

FIG. 8 illustrates the structure of a homopolar crystal that incorporates an impurity. The positive ions which predominantly represent the structure of the crystal are effectively shielded by the electron distribution which, as mentioned above, is practically continuous throughout the crystal structure. The above-alluded to band theory takes into account the positive ions in its description of the electron energy structure, and therefore they can be disregarded in the following discussion; it must be kept in mind that the electrons are distributed essentially continuously, in the above-mentioned sense, throughout the crystal; for the sake of simplicity these electrons and positive ions are not indicated in FIG. 8. The holes in the electronic distribution can be considered to be semilocalized on the negative impurity ions, such as the oxygen ions introduced during the above-described manufacture of the detecting body, nevertheless allowing poor p-type semiconductivity. FIG. 8 indicates the impurity ions at In, and the holes at h, below the surface S of crystal C.

In FIG. 9, a small number of positive charges p have been introduced on the surface S of the crystal C. In this case, the holes h are repelled from the neighborhood of the surface, in other words the positive surface charge is essentially neutralized by the negative ions near the surface.

If, as illustrated in FIG. 10, the surface concentration of charges p becomes so great that the negative impurity ions are no longer adequate to neutralize the surface, a sufficient excess number of electrons will be pulled to the inside surface to counterbalance these charges resulting in an increased electron density, indicated by electrons e in FIG. 9, and varying the electric potential of the crystal in such a way as to make these electrons conducting. For reasons apparent from the above definitions of both types of impurity semiconductors, this condition can be described as a layer of n-type conductivity on a p-type semiconductor, and the conducting electron layer is called a channel. The mobility of the electrons in this layer is higher than that of the holes in the interior of the crystal because the negative acceptor ions cannot appreciably deter the electron motion. The conductivity of the channel is, in fact, approximately proportional to the surface density of these electrons. The outer and inner surface layers, indicated at p and e of FIG. 10, form a dipole layer.

It will now be evident that adsorption of molecules with dipole moments must produce an alteration in the conductivity. The mechanism for this is not established, but the existence of a formal relation between the strength of a dipole layer on the surface and the conductivity will be clear from the above discussion if it is observed that an absorbed molecule with a dipole moment can be considered to simulate a surface charge, due to the asymmetry of the charge distribution on such a molecule. A plausible explanation therefore assumes, with sufficient experimental support, that the adsorption of molecules with dipole moments on the surface of a monocrystalline or polycrystalline p-type semiconductor can simulate a distributed surface charge in the sense indicated by the preceding explanations, which outer surface charge induces a redistribution of charge in a layer of finite thickness below the surface, so as to render this layer conducting, with electrons as carriers. The degree of subsurface conductivity is determined by the number of such molecules adhering to the surface and so affords the possibility of measuring the concentration of such molecules in the environment of the surface of the semiconductor. Since the effect is present only for the class of molecules satisfying the above conditions, namely molecules having dipole moments, a means is afforded for a qualitative detection and the quantitative density measurement of such molecules in the environment of the semiconductor. If the dipole moment molecules are water molecules, the ambient moisture can be measured.

Since the vapor pressure of some substances which affect semiconductors in this manner is an extremely sensitive function of temperature, devices according to the invention can be used as temperature indicators with quite exceptional attributes such as short response time and high intrinsic accuracy of a comparatively very inexpensive compact, and rugged apparatus. By sealing a semiconductor of the present type into a container with a partial vacuum over a small amount of methanol or other volatile substance having a dipole moment as shown in FIG. 5, the semiconductor can be made to respond to variation in concentration of the dipole moment substance in the enclosed atmosphere and hence to temperature changes which can thus be detected in terms of change in subsurface conductivity.

Similar phenomena might be expected, on the basis of the above-explained concepts, in the case of n-type semiconductors with a negative surface charge. In that case holes would have to become available at the surface. The functional behavior in such a case would not deviate qualitatively from that described in detail above, although it is believed that such behavior as observed up to the persent time has been associated with the above interpretation of behavior of p-type material.

Only molecules having dipole moments affect the conductivity of detector bodies according to the invention, such as water, methyl alcohol and acetic acid, whereas acetone, carbon tetrachloride, ether, benzene and toluene have no effect. The order of magnitude of the conductivity induced by dipole moment molecules can be regulated by varying the amount of impurity oxygen that is introduced during sintering of the detector bodies, such as by regulating the oxidation-reduction properties of the ambient during the heat treatment of the initial slurry, as above described. The conductivity range can also be regulated by adding to the slurry small amounts of modifiers, such as lithium oxide which probably affects the preponderance of one or the other oxide in the fiinished detector body. These facts confirm the above-outlined explanation of the mode of operation of these bodies.

It should be understood that the present disclosure is for the purpose of illustration only and that this invention includes all modifications and equivalents which fall within the scope of the appended claims.

I claim:

1. In the art of qualitative and quantitative detection of gases and vapors, probe means comprising; two conducting members spaced from each other; crystalline body means joined to said conducting members and including a substance of the group consisting of germanium, oxides of cobalt, and oxides of nickel, in the form of a plurality of crystals in contact at least over part of the surfaces of said crystals such as to present at least one essentially continuous superficial bridge between said conducting members, an appreciable portion of said body means being freely exposed to said gases and vapors, said body means having a surface conductivity directly responsive to the amount of said gases and vapors in contact therewith; and measuring means including a voltage source connected across said conducting members and means for detecting conductivity variations of said body means caused by the effect of ambient gases or vapors of certain properties upon the electronic energy structure and thus the conductivity of the body.

2. In the art of qualitative and quantitative detection of gases and vapors, a device comprising: support means having two terminal members; two metallic holding wires individually connected to said terminal members; body means located between said wires and consisting essentially of crystals of at least one cobalt oxide arranged to form a continuously superficial bridge between the wires, an appreciable portion of said body means being freely exposed to said gases and vapors, said body means having a surface conductivity directly responsive to the amount of said gases and vapors in contact therewith; means for measuring the conductivity of said body means, said measuring means including a source of voltage connected across said terminal members, means for amplifying the variations in potential drop across said terminal members, and meter means for indicating said variations in potential drop.

3. In the art of qualitative and quantitative detection of gases and vapors, probe means comprising: two conducting members spaced from each other, a crystalline body means joined to said conducting members and including a substance of the group consisting of germanium, oxides of cobalt, and oxides of nickel, in the form of a plurality of crystals in contact at least over part of the surfaces of said crystals such as to present at least one essentially continuous electrical bridge between said conducting members, an appreciable portion of said body means being freely exposed to said gases and vapors, said body means having a surface conductivity directly responsive to the amount of said gases and vapors in contact therewith; and a measuring circuit including electronic valve means having anode, cathode and control electrode, voltage supply means connected to said anode and cathode, means for applying a biasing potential to said control electrode, means for connecting said conducting members in parallel to said biasing means, and means for measuring the conductivity of said valve means as affected by the changing conductivity of said valve means as affected by the changing conductivity of said body; whereby ambient gases or vapors of certain properties affect the electronic energy structure and thus the conductivity of said body, dependent on the nature and amount of the gas or vapor, permitting detection or measurement thereof by way of said measuring means.

References Cited in the file of this patent

UNITED STATES PATENTS

| | | |
|---|---|---|
| 1,526,139 | Grondahl | Feb. 10, 1925 |
| 1,978,163 | Megow | Oct. 23, 1934 |
| 2,173,186 | Swartz et al. | Sept. 19, 1939 |
| 2,332,392 | Minter | Oct. 19, 1943 |
| 2,471,592 | Thomson | May 31, 1949 |
| 2,571,605 | Peters | Oct. 16, 1951 |
| 2,638,783 | Rittner et al. | May 19, 1953 |
| 2,689,294 | Weber et al. | Sept. 14, 1954 |
| 2,710,899 | Marsden et al. | June 14, 1955 |
| 2,711,511 | Pietenpol | June 21, 1955 |
| 2,740,032 | Bouyoucos | Mar. 27, 1956 |
| 2,771,650 | Weisheit | Nov. 27, 1956 |
| 2,804,593 | Eicken (Estienne) | Aug. 27, 1957 |

FOREIGN PATENTS

| | | |
|---|---|---|
| 792,829 | France | Oct. 28, 1935 |

OTHER REFERENCES

Article by Batcher, Electronic Industries, January 1945, p. 76 (pp. 77–80 of interest but not cited). (Copy in Scientific Library, U.S. Patent Office.)

Article by LARK-Horovitz, Electrical Engineering, December 1949, pp. 1047–1056. (Copy in Scientific Library U.S. Patent Office.)

Article by Becker et al.: Electrical Engineering, Transactions Section, November 1946, pp. 711–725. (Copy in Scientific Library, U.S. Patent Office.)